Inventor
Robert R. Freas

June 27, 1950

R. R. FREAS 2,512,927

WATTMETER CIRCUITS

Filed Aug. 12, 1948

2 Sheets-Sheet 2

Inventor
Robert R. Freas
By
Conder C. Henry
Attorney

Patented June 27, 1950

2,512,927

UNITED STATES PATENT OFFICE 2,512,927

WATTMETER CIRCUITS

Robert R. Freas, Jermyn, Pa., assignor to Radio Corporation of America, a corporation of Delaware Application August 12, 1948, Serial No. 43,805

5 Claims. (Cl. 171—95)

My invention relates to improvements in radio-frequency alternating current measurements and more particularly to improvements in apparatus for measuring power and energy quantities in the radio-frequency spectrum by direct reading instruments.

It is the object of my invention to provide a radio-frequency wattmeter, enabling direct power measurement, having an accurate response over a wide range of frequencies.

It is also an object of my invention to provide a simple radio-frequency wattmeter requiring a minimum of training in its use.

It is a further object of my invention to eliminate sources of error in radio-frequency wattmeters employing the paired thermocouple principle.

According to my invention, I provide a radio-frequency wattmeter incorporating a current transformer and paired thermocouples. The secondaries of the current transformer are identically polarized. Frequency effect errors are eliminated by utilizing a circuit in which the circuits of the thermocouples are symmetrical to ground. In one thermocouple, current from the primary side of the transformer through a resistor adds to the current due to transformer action; in the other thermocouple, the two currents oppose and a meter connected in series with the thermocouple junctions sees the difference.

Figure 1:
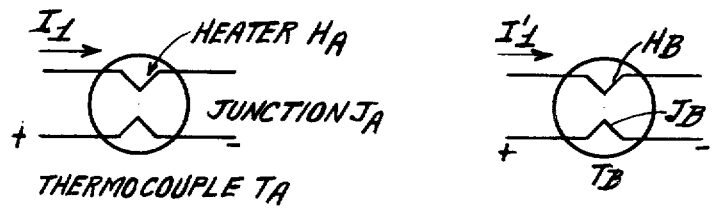
Figure 2:
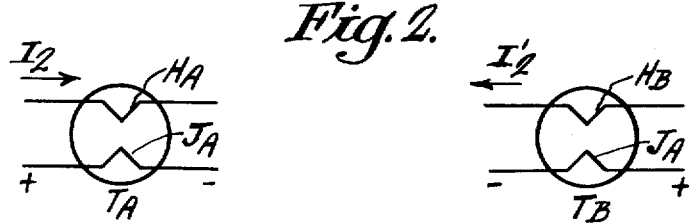
Figure 3:
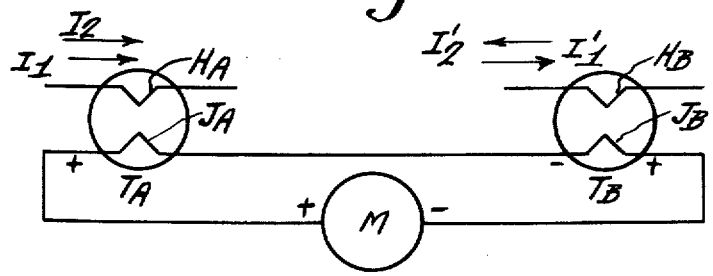
Figure 4:
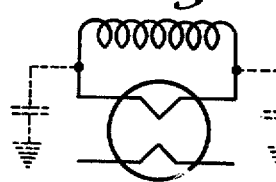
Figure 5:
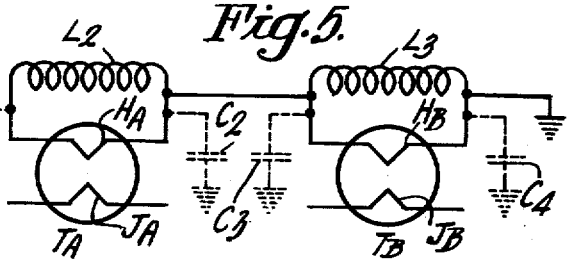
Figure 6:
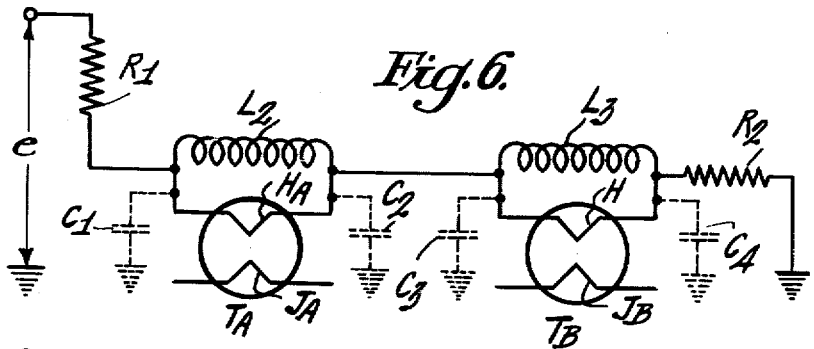
Figure 7:
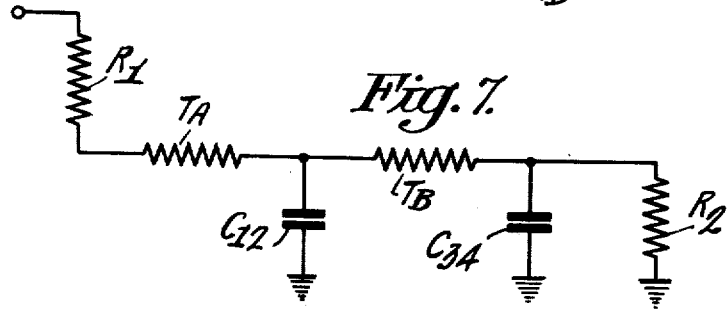
Figure 8:
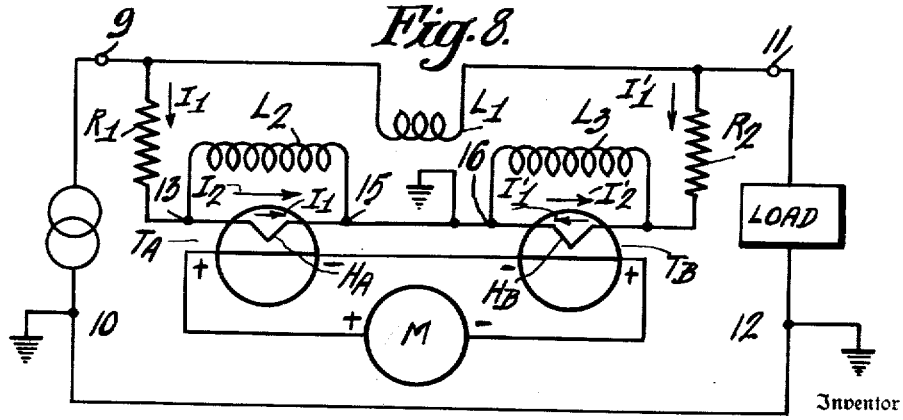

The organization and method of operation, together with additional objects and advantages thereof will be apparent from the following description when read in connection with the accompanying drawing in which like numerals are employed to designate like parts throughout the same, Figures 1 and 2 each represent schematically a pair of vacuum thermocouples $T_A$ and $T_B$, Figure 3 represents schematically a pair of vacuum thermocouples $T_A$ and $T_B$ having their thermal generating elements serially connected with an indicating device, Figure 4 represents schematically a transformer secondary with its inherent capacity to ground, Figure 5 represents schematically two transformer secondaries serially connected and their inherent capacities to ground, Figure 6 represents schematically a proportional to voltage circuit in which the two transformer secondaries and the two resistances are serially connected, Figure 7 represents schematically a simplification of Figure 6, and Figure 8 represents schematically a specific embodiment of my invention.

In the past, thermocouple type radio frequency ammeters have been used for radio-frequency current and power indication; however, these meters have a non-linear scale which is compressed in the low current section and expanded in the high current section. It is well known that when a variable frequency is fed into a conventional antenna, the maximum antenna current at some frequencies will be a small percentage of the maximum antenna current at other frequencies. However, these low currents represent full transmitter output. If the antenna current meter is to be useful in tuning or observing output at all frequencies, it must give a readable indication of these low currents. The thermocouple type radio-frequency ammeters having a compressed scale in the low current section are of little value as a tuning aid or power measuring device, except within a limited range of frequency.

One device that has been used to measure radio-frequency power is the two-vacuum tube circuit described by Pierce, Proceedings of I. R. E., vol. 24, No. 4, pp. 577–583. This wattmeter is rather complex, requiring two vacuum tubes, power supply, and other components, and has a serious variation in meter readings for constant power as the frequency is changed.

It has been suggested that a single pentode tube may be utilized, but in order to use this method it is necessary to take the mean value of two measurements to nullify an error in reading due to harmonics. These conditions tend to restrict the use of such a method of power measurement to the laboratory.

There has also been devised another method of radio frequency power measurement based on the use of two triodes as square law voltmeters. While the reading of such a meter is proportional to the power at any one frequency, there is a great variation of meter readings, at constant power, as the frequency is changed.

The principle of utilizing paired thermocouples for power measurement was first disclosed by Bauch and later expanded by others. Bauch suggested that a pair of thermocouples be utilized in an arrangement with their output in opposition; however, the prior circuits of this type have inherent errors when used at different frequencies.

An analysis of the difficulties encountered in these previous circuits is presented in the following discussion from which the merits of my invention will be readily seen.

The operation of vacuum thermocouple wattmeters centers upon two identical thermocouples which preferably are of the vacuum type, with the heater element insulated from the thermal generating element. Let us assume that in some manner we induct currents in each thermocouple as shown in Fig. 1. These currents are equal in magnitude and phase; we will designate these currents by $\bar{I}_1$ and $\bar{I}'_1$. Then as indicated in Fig. 2 we will in some manner induct another currents $\bar{I}_2$ and $\bar{I}'_2$ in each heater element but make the current in one heater element, HB, flow in the opposite direction to the current in the other heater element, HA. It is assumed that the method of obtaining the currents, $\bar{I}_1$ and $\bar{I}_2$, is such that these currents are entirely independent of each other. Then the current flow is as shown in Fig. 3 where the heater element, HA, carries the sum of two currents, while the heater, HB, carries the difference of the two currents. The meter is connected as shown in Fig. 3 so that the thermal generating element voltages oppose each other.

If the couples follow the normal square law, the deflection of the meter due to one couple is $$D = KI^2$$

where I is the absolute value of the current flowing in the heater element and K is a constant of the circuit.

Returning now to Fig. 3 let us assume that $I_2$ leads $I_1$ by an angle $\theta$. Then the current in the heater element HA is $$\bar{I}_A = \bar{I}_1 + \bar{I}_2 = I_1 + I_2 \cos\theta + jI_2 \sin\theta$$

the current in the heater element HB is $$\bar{I}_B = \bar{I}'_1 - \bar{I}'_2 = I_1 - I_2 \cos\theta - jI_2 \sin\theta$$

the square of the absolute value of each of these currents is $$I_A^2 = I_1^2 + I_2^2 + 2I_1I_2 \cos\theta$$

and $$I_B^2 = I_1^2 + I_2^2 - 2I_1I_2 \cos\theta$$

Because of the manner in which the meter is connected in Fig. 3, the deflection will be $$D = D_A - D_B = K(I_A^2 - I_B^2) = 4KI_1I_2 \cos\theta$$

If we now feed power to a load and fulfill the following conditions:

1. $I_1$ is always proportional to the load voltage,
2. $I_2$ is always proportional to the load current,
3. The phase angle $\theta$ between $I_1$ and $I_2$ is equal to the phase angle between the load voltage and the load current, we see that the deflection as indicated by the latter equation will always be proportional to the power into the load.

Let us consider the capacity to ground of a transformer secondary as shown in Fig. 4 which acts in shunt with the thermocouple heater. At high frequencies, the capacitive reactance is lower than at low frequencies, and this shunting effect is more pronounced. As this results in little current through the thermocouple heater element, a meter across the thermal generating element would read lower at high frequencies than at low frequencies, primary current remaining the same.

If we have two secondaries and if neither secondary is grounded, the meter readings will be identical for both. If one end of one secondary is grounded and its other end is connected to the other secondary, as shown in Fig. 5, the shunt path around the heater element $H_A$ of the thermocouple $T_A$ will be through the capacitance $C_1$ to ground and back through the capacitance $C_2$ to the secondary.

The shunt path around the heater element $H_B$ of the thermocouple $T_B$ will be through the capacitance $C_3$ to ground and directly back to the other end of the secondary. In the former case, the reactance in this shunt path is double the reactance of the shunt path in the latter case, and half the current will flow. Therefore, the heater element $H_A$ will receive more current than the heater element $H_B$ and a direct current meter connected at the thermal generating element will read higher in the case of thermocouple $T_A$.

This unbalance is directly proportional to frequency, being greater at higher frequencies and having very little effect at low frequencies.

Suppose, instead of grounding the secondary $L_6$, we insert a resistance $R_2$ to ground as shown in Fig. 6. If the inserted resistance is large compared to the capacitive reactance of the condenser $C_4$ at a given frequency, the unbalance between the thermocouples will be small. Conversely, a small resistance results in an appreciable unbalance of current between the two thermocouples.

From the standpoint of balancing the current transformer then, it is desirable that the resistance between the secondary $L_6$ and ground be as large as possible.

The proportional-to-voltage circuit of the wattmeter will then see the condition where the reactance of the secondary will be large compared to the resistance of the thermocouple heaters.

Referring to Fig. 7, suppose the resistance $R_2$ is infinite. Then, it can be seen from this equivalent circuit that the thermocouple $T_A$ will receive more current than the thermocouple $T_B$, the difference becoming greater for lower capacitive reactance. But, the capacitance $C_{12}$ is equal to the capacitance $C_{34}$ and the resistance of the thermocouple $T_B$ is considerably smaller than the capacitive reactance of the condenser $C_{34}$; therefore, a lower capacitive reactance means greater total current, of which about half flows through each branch.

Now suppose the inserted resistance $R_2$ is low compared to the capacitive reactance. The current will flow through the thermocouple $T_A$, the thermocouple $T_B$, and the resistance $R_2$ to ground, with little current through the capacitance $C_{12}$ and the capacitance $C_{34}$ to cause unbalance. The thermocouple $T_A$ and the thermocouple $T_B$ now receive nearly equal current, which is desirable.

From the standpoint of balancing the proportional to voltage circuit, it is desirable that the resistance between the secondary $L_6$ and ground be as small as possible.

It is therefore apparent that the circuits of the thermocouple $T_A$ and the thermocouple $T_B$ must be symmetrical with respect to ground in order to reduce frequency effect errors. This symmetry is not obtained in the present type thermocouple wattmeter.

Referring to Figure 8, the apparatus shown comprises an input circuit indicated by the conductors 9 and 10, to be supplied from a source of radio-frequency power; and an output circuit indicated by the conductors 11 and 12, to be connected to the load whose power consumption is to be measured. There is provided a current-transformer having a primary winding $L_1$, and substantially identical, secondary windings $L_2$ and $L_3$, which are identically polarized. The primary winding is connected in series with the input conductor 9 and the output conductor 11. It is to be noted that in practical application the remaining input and output conductors are at the same reference potential as the grounded point G, as indicated by the ground connections. An impedance $R_1$ is connected between the input side of the primary winding $L_1$ and a terminal 13 of the secondary winding $L_2$. Between the output side of the primary winding $L_1$ and a terminal 14 of the secondary winding $L_3$ is connected a second impedance $R_2$, substantially equal to the first impedance $R_1$. To complete the circuit symmetry of the secondaries, a terminal 15 of the secondary winding $L_2$ and a terminal 16 of the other secondary winding are connected together and grounded, as indicated at point G. A vacuum thermocouple $T_A$, comprising a heater element $H_A$ and a thermal generating element $J_A$, is connected with its heater element across the secondary winding $L_2$; a second vacuum thermocouple $T_B$, comprising a heater element $H_B$ and a thermal generating element $J_B$, is connected with its heater element across the other secondary winding $L_3$. A meter M, calibrated in watts, is connected in series arrangement with the thermal generating elements of he two thermocouples $T_A$ and $T_B$, which are so connected as to oppose each other.

If we temporarily disconnect the resistors, and allow only the currents $I_2$ and $I'_2$, produced by transformer action to flow, the thermocouples $T_A$ and $T_B$ will receive equal currents, regardless of frequency or transmitter load. These currents will be proportional to the load current and independent of load voltage, which is essential for accurate wattmeter operation.

Let us now assume that the resistors are reconnected and that the primary winding of the current-transformer is removed from the circuit by shorting or other means. Both thermocouples will now receive equal currents, through the resistors, at all frequencies and for all values of load current. This too is essential for accurate wattmeter operation.

By replacing the primary winding in the circuit and restoring it to the original condition we combine the two above desirable effects. It is seen, therefore, that the present invention eliminates the frequency errors present in conventional paired thermocouple wattmeters, without causing detrimental effects.

It is to be understood that the form of my invention, herewith shown and described, is to be taken as a preferred example of the same, and various changes in the shape, size and arrangement of parts may be resorted to, without departing from the spirit of my invention, or the scope of the subjoined claims. Having thus described my invention, I claim:

1. In apparatus for measuring alternating-current power, a transformer comprising a primary winding and two substantially identical secondary windings, an impedance means connected between one side of said primary winding and one side of one of said secondary windings, a second impedance means connected between the other side of said primary winding and one side of the other of said secondary windings, circuit means connecting said secondary windings in series, separate thermocouple means each having a heater element and a thermal responsive generating element, the said heater element of one of said thermocouple means being connected across one of said secondary windings, the said heater element of another of said thermocouple means being connected across the other of said secondary windings, a meter responsive to currents generated by said thermocouple generating elements, and circuit means connecting said thermocouple generating elements and said meter in series arrangement.

2. In apparatus for measuring alternating-current power, a current-transformer having a primary winding and two substantially identical secondary windings, circuit means connecting one side of each of said secondary windings to ground, a first impedance means connected between one side of said primary winding and the unconnected side of one of said secondary windings, a second impedance means connected between the other side of said primary winding and the unconnected side of the other of said secondary windings, a first thermocouple means having a heater element and a thermal responsive generating element with said heater element connected across one of said secondary windings, a second thermocouple means having a heater element and a thermal responsive generating element with said heater element connected across the other of said secondary windings, a meter, and circuit means connecting said thermal responsive generating elements and said meter in series arrangement.

3. In apparatus for measuring alternating-current power, a transformer comprising a primary winding and two substantially identical, similarly polarized secondary windings, an impedance means connected between one side of said primary winding and one side of one of said secondary windings, a second impedance means connected between the other side of said primary winding and one side of the other of said secondary windings, circuit means connecting the unconnected side of each of said secondary windings to ground, separate thermocouple means each having a heater element and a thermal responsive generating element, the said heater element of one of said thermocouple means being connected across one of said secondary windings, the said heater element of another of said thermocouple means being connected across the other of said secondary windings, a meter responsive to currents generated by said thermocouple generating elements, and circuit means connecting said thermocouple generating elements and said meter in series arrangement.

4. In apparatus for measuring alternating-current power, a transformer comprising a primary winding and two substantially identical, similarly polarized secondary windings, a resistor connected between one side of said primary winding and one side of one of said secondary windings, a second resistor connected between the other side of said primary winding and one side of the other of said secondary windings, circuit means connecting the unconnected sides of said secondary windings in a series additive arrangement and to ground, separate thermocouple means each having a heater element and thermal responsive generating element, the said heater element of one of said thermocouple means being connected across one of said secondary windings, the said heater element of another of said thermocouple means being connected across the other of said secondary windings, a meter responsive to currents generated by said thermocouple generating elements, and circuit means connecting said thermocouple generating elements and said meter in series arrangement.

5. In apparatus for measuring alternating-current power, supplied from an input circuit through an output circuit to a load one side of said input and one side of said load being at ground potential, a current-transformer having a primary winding and two substantially identical, similarly polarized secondary windings, said primary winding connected serially between said input and said load, circuit means connecting the unconnected side of each of said secondary windings in a series additive arrangement and to ground, a first resistor connected between the input side of said primary winding and the unconnected side of one of said secondary windings, a second resistor connected between the load side of said primary winding and the unconnected side of the other of said secondary windings, a first vacuum thermocouple means comprising a heater element and a thermal responsive generating element with said heater element connected across one of said secondary windings, a second vacuum thermocouple means comprising a heater element and a thermal responsive generating element with said heater element across the other of said secondary windings, a meter responsive to currents generated by said thermocouple generating elements, and circuit means connecting said thermal responsive generating elements in series opposite polarity and said meter in series arrangement.

ROBERT R. FREAS.

REFERENCES CITED

The following references are of record in the file of this patent:

UNITED STATES PATENTS

| Number | Name | Date |
|---|---|---|
| 2,283,566 | Miller | May 19, 1942 |
| 2,285,211 | Korman | June 2, 1942 |
| 2,316,153 | Brown | Apr. 13, 1943 |